(12) United States Patent
Serban et al.

(10) Patent No.: US 8,428,828 B2
(45) Date of Patent: Apr. 23, 2013

(54) ADAPTIVE CONTROL SYSTEM FOR AUTOMATED VEHICLE APPLICATIONS

(75) Inventors: Doru N. Serban, Richmond Hill (CA); Craig A. Kollar, Sterling Heights, MI (US); Wolfgang Rasel, Rudesheim (DE); Hans-Georg Wessollek, Stromberg (DE); Carol A. Johnston, South Lyon, MI (US); Artur J. Ostrowski, Rochester Hills, MI (US); Brad L. Pietryga, Shelby Township, MI (US); Edward M. Sanocki, Jr., Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 410 days.

(21) Appl. No.: 12/398,345

(22) Filed: Mar. 5, 2009

(65) Prior Publication Data

US 2010/0228447 A1 Sep. 9, 2010

(51) Int. Cl.
  *E05F 15/00* (2006.01)
(52) U.S. Cl.
  USPC ............................................. 701/49; 701/36
(58) Field of Classification Search ................. 701/36, 701/49
  See application file for complete search history.

(56) References Cited

U.S. PATENT DOCUMENTS

| | | | |
|---|---|---|---|
| 3,518,516 A * | 6/1970 | Pawletko | 318/400.09 |
| 5,952,801 A * | 9/1999 | Boisvert et al. | 318/468 |
| 6,253,135 B1 * | 6/2001 | Hubacher | 701/49 |
| 6,452,353 B1 * | 9/2002 | Calamatas | 318/466 |
| 6,456,916 B1 * | 9/2002 | Edgar et al. | 701/49 |
| 7,170,248 B2 * | 1/2007 | Tsui et al. | 318/466 |
| 7,212,897 B2 * | 5/2007 | Suzuki et al. | 701/49 |
| 7,432,676 B2 * | 10/2008 | Keller et al. | 318/266 |
| 2001/0022049 A1 * | 9/2001 | Clark et al. | 49/360 |
| 2002/0039008 A1 * | 4/2002 | Edgar et al. | 318/445 |
| 2002/0101210 A1 * | 8/2002 | Boisvert et al. | 318/469 |
| 2004/0124662 A1 * | 7/2004 | Cleland et al. | 296/146.4 |
| 2004/0124972 A1 * | 7/2004 | Strzelczyk | 340/426.27 |
| 2004/0183493 A1 * | 9/2004 | Boisvert et al. | 318/469 |
| 2005/0004905 A1 * | 1/2005 | Dresden | 707/3 |
| 2005/0240543 A1 * | 10/2005 | McClanahan et al. | 706/16 |
| 2006/0122876 A1 * | 6/2006 | Von Schweber et al. | 705/10 |
| 2006/0142992 A1 * | 6/2006 | Nishimura et al. | 704/1 |
| 2006/0293821 A1 * | 12/2006 | Takahashi | 701/49 |
| 2007/0035156 A1 * | 2/2007 | Compton et al. | 296/146.7 |
| 2007/0152615 A1 * | 7/2007 | Newman et al. | 318/481 |
| 2007/0299588 A1 * | 12/2007 | Warren et al. | 701/49 |
| 2008/0061719 A1 * | 3/2008 | Warren et al. | 318/14 |
| 2008/0082180 A1 * | 4/2008 | Blevins et al. | 700/29 |
| 2008/0275831 A1 * | 11/2008 | Reil | 706/23 |
| 2009/0055330 A1 * | 2/2009 | Medasani et al. | 706/2 |
| 2009/0299495 A1 * | 12/2009 | Blevins et al. | 700/28 |

\* cited by examiner

*Primary Examiner* — Joseph Rocca
*Assistant Examiner* — Barry Gooden, Jr.
(74) *Attorney, Agent, or Firm* — Ingrassia Fisher & Lorenz, P.C.

(57) ABSTRACT

An apparatus is provided for controlling an automated closure panel in a vehicle. The apparatus includes a command module configured to generate a control signal. A motor is configured to actuate the automated closure panel based upon the control signal. A motor sensor is configured to measure an output characteristic of the motor, with the motor sensor having a motor sensor output signal. An adaptive logic module is coupled to the command module and to the motor sensor. The adaptive logic module is configured to provide an output to the command module to thereby adjust the control signal, wherein the adaptive logic module is configured to determine when the automated closure panel is obstructed by an obstacle based upon the motor sensor output signal.

17 Claims, 4 Drawing Sheets

ADAPTIVE CONTROL SYSTEM FOR AUTOMATED VEHICLE APPLICATIONS

TECHNICAL FIELD

The following disclosure generally relates to automated vehicle control systems, and more particularly relates to control systems for automated closure panel applications such as an automated liftgate in a vehicle.

BACKGROUND

Automated devices are increasing in applications in vehicles such as automated vehicle closure panels. Automated devices are objects connected to motorized systems that move the object automatically in response to an input. One example of an automated device is an automated liftgate that opens to allow access to the back of the vehicle. The automated liftgate typically operates automatically in response to a button pressed on a key fob or a button in the cab. When the automated liftgate is opening or closing, it is possible for an obstacle to be present that would prevent the liftgate from opening or closing. In many cases, to prevent damage to the obstacle or the liftgate, a sensing control system is configured with relatively high sensitivity. Unfortunately, this level of sensitivity can result in the sensing system occasionally identifying obstacles when none are actually present. When accelerometers are used to detect objects in a sensing control system, for example, a false detection may occur from the motion of a person entering or exiting the vehicle or other motions of the vehicle that affect the liftgate. These same issues, as well as others, may apply to many different automated closure panels in vehicles including automated liftgates.

Automated closure panels in vehicles generally require calibrations that include determining operating parameters under many different operating conditions, and over the expected life of the vehicle. In many cases the calibration process involves extensive testing to gather data for the operating parameters. Operating conditions may include changes such as temperature, altitude, pressure, grade, wearing of parts, friction changes or other changes in functioning parts. A calibration process including extensive testing is used to determine expected operating conditions for the life of the vehicle, and to configure parameters for the automated closure panel to operate within those parameters as changes occur over time and/or for different operating conditions.

Accordingly, it is desirable to provide an improved control system for operating automated closure panel applications in a vehicle such as a liftgate. In addition, it is desirable to provide improved methods of operating an automated application in a vehicle to identify obstacle events (e.g. when an obstacle is encountered by the automated closure panel), and to reduce the need for extensive calibration testing. Furthermore, other desirable features and characteristics will become apparent from the subsequent detailed description and the appended claims, taken in conjunction with the accompanying drawings and the foregoing technical field and background.

SUMMARY

An apparatus is provided for controlling an automated closure panel in a vehicle. The apparatus includes a command module configured to generate a control signal. A motor is configured to actuate the automated closure panel based upon the control signal. A motor sensor is configured to measure an output characteristic of the motor, with the motor sensor having a motor sensor output signal. An adaptive logic module is coupled to the command module and to the motor sensor. The adaptive logic module is configured to provide an output to the command module to thereby adjust the control signal, wherein the adaptive logic module is configured to determine when the automated closure panel is obstructed by an obstacle based upon the motor sensor output signal.

A method is provided for controlling an automated device in a vehicle. The automated device is actuated by a motor. The method comprises receiving input data related to a load on the motor and related to a position of the automated device. The input data is processed using a pattern recognition module configured to identify patterns in the input data. A determination is made whether the automated device is obstructed by an obstacle based on the patterns in the input data. The motor is driven based upon the determination of whether the automated device is obstructed.

DESCRIPTION OF THE DRAWINGS

A more complete understanding of the subject matter may be derived by referring to the detailed description and claims when considered in conjunction with the following figures, wherein like numerals denote like elements.

DESCRIPTION OF AN EXEMPLARY EMBODIMENT

Figure 1:
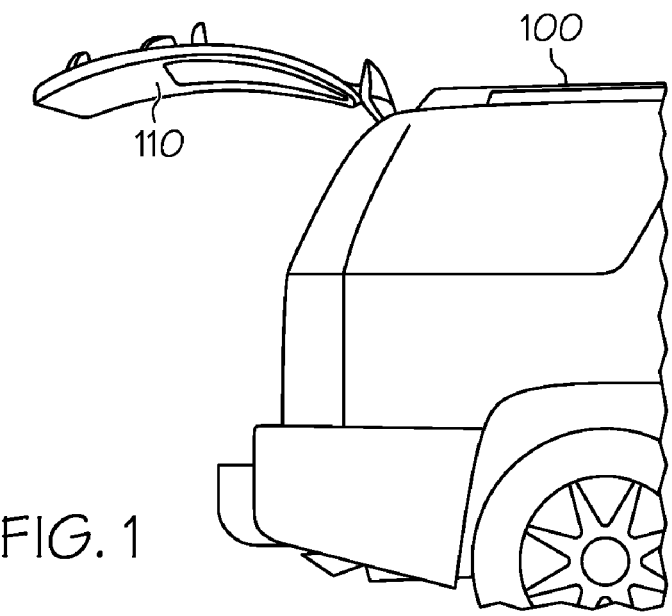
FIG. 1 is a side view of an exemplary vehicle with an automated liftgate.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As shown in FIGS. 1-4 an automated device in a vehicle 100 may be an automated liftgate 110, an automated moveable roof 112, power doors such as an automated sliding door 114 and/or an automated hinged door 116. Automated devices in vehicle 100 may also include an automated trunk lid 120, and/or automated folding seats 124. Other devices on vehicle 100 may be automated such as a power hood, power running boards, and power mobility ramps and mobility seats on vehicles equipped for persons with limited mobility.

FIG. 1 shows an automated liftgate 110 attached at the rear of vehicle 100. In the exemplary embodiment liftgate 110 is hinged at the top of vehicle 100 and opens to provide access to the entire rear opening of vehicle 100. In other embodiments liftgate 110 may have other configurations.

In an exemplary embodiment an automated device such as liftgate 110 is designed to structurally withstand the forces of an actuator applied by the motor when liftgate 110 is opening and closing. Liftgate 110 may also be structurally designed to withstand forces of the motor on liftgate 110 when liftgate 110 encounters an obstacle during opening and closing. In operation of an automated device, an obstacle event occurs when the automated device is restricted or encounters resistance from an obstacle during operation.

Typically liftgate 110 includes structural reinforcements for bearing the force from the motor when liftgate 110 is obstructed by an obstacle. In an exemplary embodiment the structural reinforcements may be reduced or removed when compared to conventional liftgates, thereby saving weight, material, and/or other manufacturing costs. The maximum force applied by the motor during an obstacle event may determine the size and weight of the structural reinforcements. When liftgate 110, for example, is obstructed by an obstacle such as a wall that prevents liftgate 110 from opening, a motor may continue to apply a force on the liftgate until the control system determines that an obstacle is present and stops or reverses the motor. If there is a significant delay between liftgate 110 encountering an obstacle and the control system recognizing an obstacle event, then suitable reinforcements in liftgate 110 could be useful to prevent damage to the liftgate from the force of the motor. The reinforcement may add weight to the liftgate and the vehicle. If accuracy is increased and/or time delay is decreased in recognizing and acting on an obstacle event, then liftgate 110 may be produced with less reinforcement and weight, thereby saving costs in material. Advantages from the use of various embodiments may also include the reduction and/or removal of protective structures on vehicle 100 including protective appliques, protective moldings, protective rub strips as well as other protective devices. Similar benefits as those described in connection with exemplary liftgate 110 may be obtained in other automated devices, such as the devices discussed below, as well as other devices.

Figure 2:
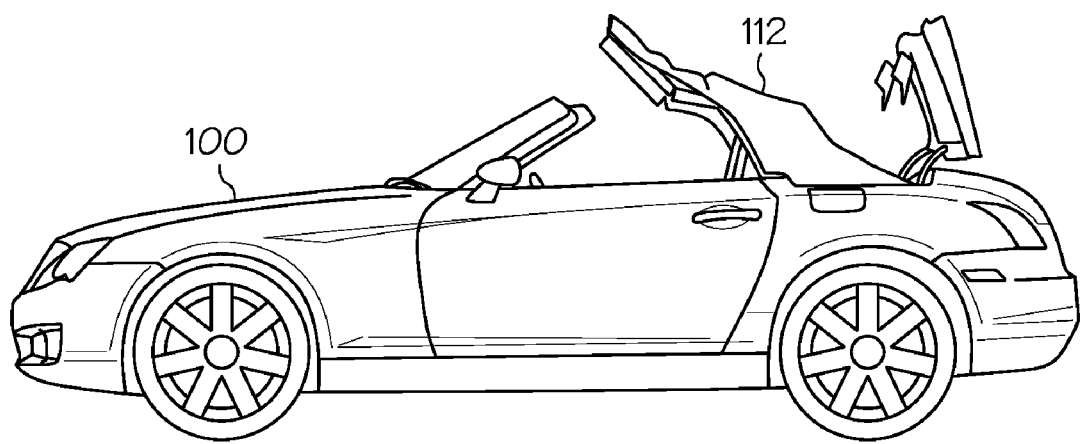
FIG. 2 is a side view of an exemplary vehicle with an automated moveable roof.

FIG. 2 shows exemplary vehicle 100 with an automated moveable roof 112. Moveable roof 112 may be a roof with a soft top or a hard top. In the exemplary embodiment moveable roof 112 is a soft top that includes the full roof. In other embodiments the moveable roof may be a portion of the roof, as well as other configurations of moveable roof 112.

Figure 3:
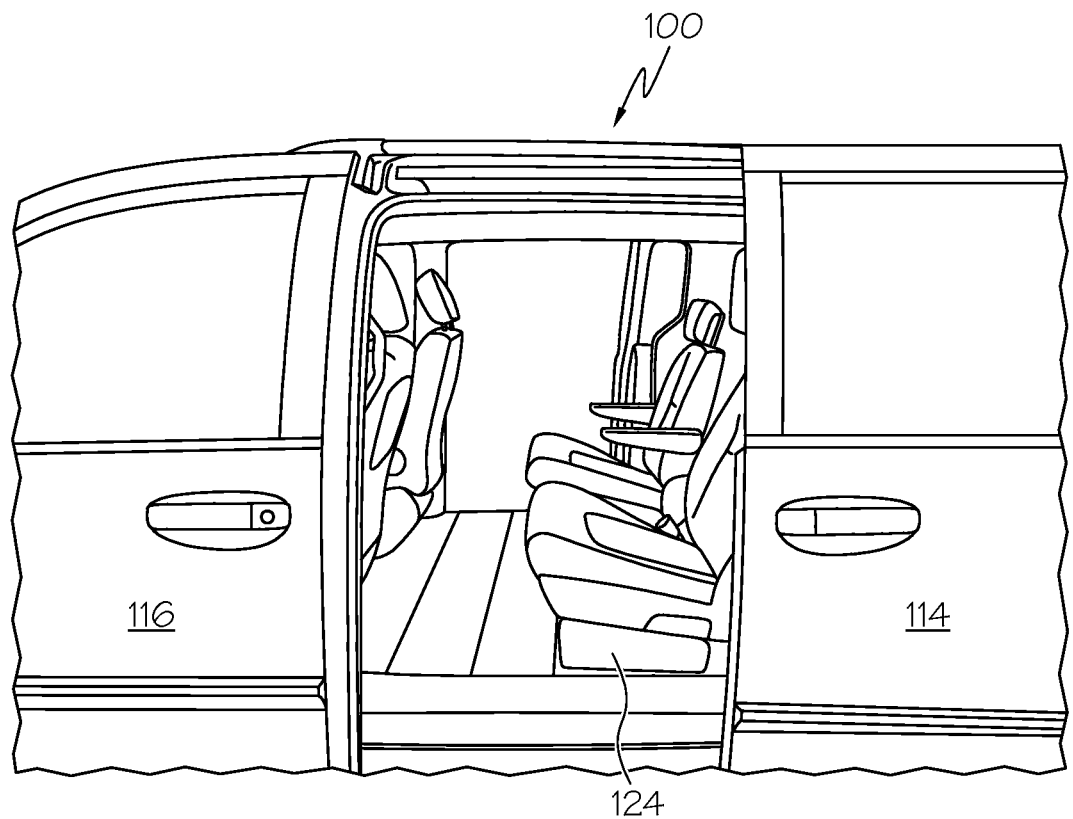
FIG. 3 is a side view of an exemplary vehicle with automated doors.

FIG. 3 shows vehicle 100 with automated doors such as an automated sliding door 114 and an automated hinged door 116. In other embodiments automated doors with other hinge types may be used. FIG. 3 also shows an exemplary automated folding seat 124. In the exemplary embodiment automated folding seat 124 folds into a compartment in the vehicle floor.

Figure 4:
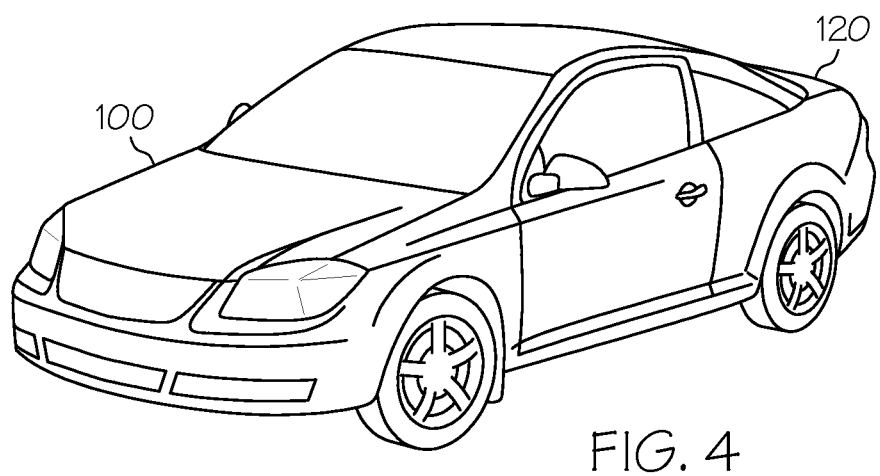
FIG. 4 is a perspective view of a vehicle with an automated trunk lid.

FIG. 4 shows exemplary vehicle 100 including automated trunk lid 120. As with the other automated devices, automated trunk lid 120 may open and/or close in an automated manner in response to an input from a user. In other embodiments other closure panels and/or other automated devices may be used. An automated closure panel is any panel for an opening that is configured to operate in an automated manner. In one embodiment a vehicle closure panel is a panel for an opening that provides access to the interior of vehicle 100 from the exterior of vehicle 100.

For the purpose of simplicity the following discussion will focus primarily on an automated liftgate 110; the principles discussed below, however, may be applied to other automated devices such as those shown in FIGS. 1-4, as well as other automated devices.

An exemplary control system for an automated device includes a motor with a motor sensor that provides feedback related to a load on the motor. In one embodiment the load on the motor is related to force exerted by the motor on the automated device. A calibration process may be used to correlate the force exerted on the automated device to the load on the motor. The exemplary embodiment may also include an adaptive logic module that adapts to operating conditions of the automated device. The motor sensor and the adaptive feedback control may provide a faster response time in determining an obstacle event, relatively higher accuracy than conventional controls in determining obstacle events, and/or a shorter calibration process. The exemplary embodiment may also allow an automated device to be produced with lower costs in materials than conventional controls.

Figure 5:
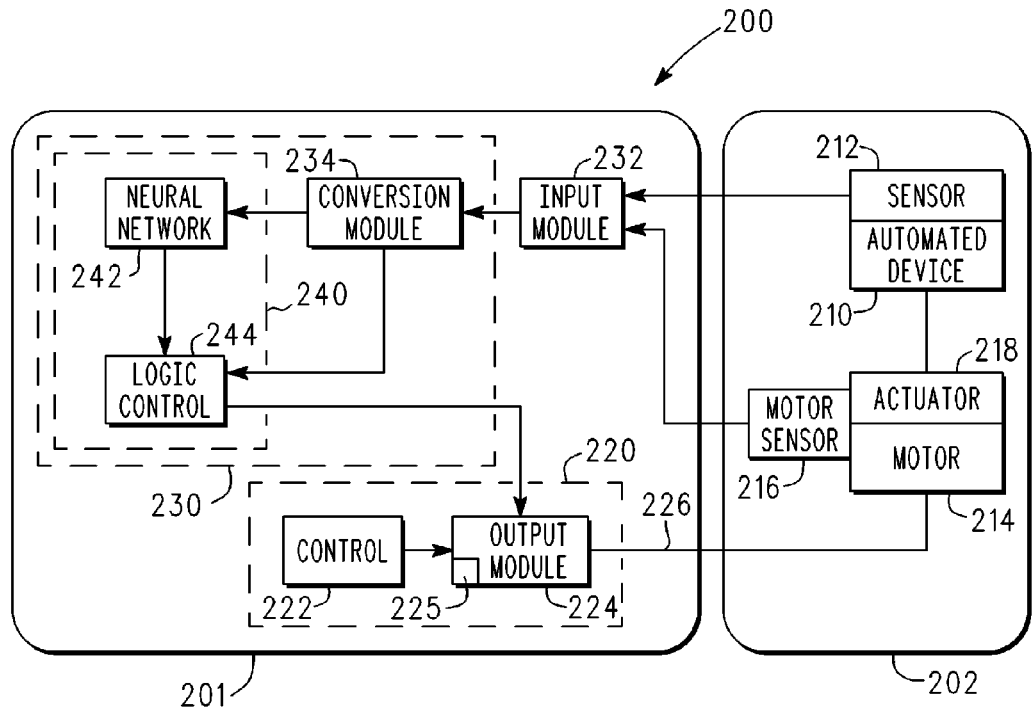
FIG. 5 is a diagram of an exemplary system with a feedback control module for an automated device.

FIG. 5 shows a diagram of an exemplary control system 200. In an exemplary embodiment, control system 200 includes a feedback control module 201 and a mechanism module 202. Mechanism module 202 may include a motor 214 driven by feedback control module 201, and an actuator 218 that transfers motion from motor 214 to an automated device 210. A motor sensor 216 may also be coupled to motor 214 to measure an output characteristic of motor 214 either directly or indirectly. In the exemplary embodiment a position sensor 212 measures the position of automated device 210 either directly or indirectly. Position sensor may be any type of encoder such as a Hall effect sensor, a potentiometer, an accelerometer, and/or an optical device. In the exemplary embodiment, feedback control module 201 receives signals from motor sensor 216 and position sensor 212 to control the motion of automated device 210 and to determine when automated device 210 encounters an obstacle. Feedback control module 201 may be implemented in a processor or multiple processors using software and/or firmware modules. Feedback control module 201 may also be implemented in hardware modules.

In an exemplary embodiment feedback control module 201 receives a motor sensor output signal from motor sensor 216 to provide feedback related to the load on motor 214. Feedback control module 201 may receive a position sensor output signal from position sensor 212 for feedback related to the position of automated device 210. In the exemplary embodiment feedback control module 201 is configured to recognize patterns in the output signals from motor sensor 216 and position sensor 212. The patterns recognized by feedback control module 201 may relate the position of automated device 210, the load on motor 214, time, and/or other factors to develop a normal operating pattern. If normal operating conditions change due to wear, or temperature, or other factors, feedback control module 201 may update the normal operating pattern. In the exemplary embodiment feedback control module 201 determines when an obstacle event occurs by comparing signals from position sensor 212 and motor sensor 216 to the normal operating pattern.

Feedback control module 201 suitably includes an input module 232, an adaptive logic module 230 and a command module 220. In an exemplary embodiment input module 232 is a data acquisition unit that is part of a digital signal processor. Input module 232 may receive signals from motor sensor 216 and position sensor 212. Input module 232 may also receive input data from other sensors on vehicle 100 such as a temperature sensor that determines temperature of the interior and/or exterior of vehicle 100. Other sensors may include a level sensor that determines the angle of vehicle 100 with respect to level, an altitude sensor that determines the altitude of vehicle 100 with respect to sea level, and/or other sensors that determine conditions related to vehicle 100. Data received by input module 232 may be used by adaptive logic module 230 to determine how to control motor 214 for current conditions of vehicle 100.

In the exemplary embodiment adaptive logic module 230 includes a conversion module 234, and an artificial intelligence module 240. Conversion module 234 may convert input signals from the input module into a format used by artificial intelligence module 240. Conversion module 234, for example, may use a fast Fourier transform to convert input signals into frequency components. Artificial intelligence module 240 may include a neural network 242 and a logic control 244. In the exemplary embodiment conversion module 234 provides input signals such as the output signals from motor sensor 216 and position sensor 212, in a digital format with frequency components to neural network 242 and logic control 244. Other data may also be provided to neural network 242 and logic control 244 such as data related to vehicle conditions.

Neural network 242 uses any suitable data processing modeling to determine patterns in the data related to automated device 210. Neural network 242 may be implemented in a hardware artificial neural network, and/or as a software artificial neural network stored in memory, firmware and/or the like. Neural network 242 may use information received from input module 232 and conversion module 234 to update a data processing model. Neural network 242 may learn from, and/or adapt to, the operating conditions of automated device 210. In one embodiment neural network 242 can recognize multiple patterns with some patterns indicating normal operating conditions, and other patterns indicating abnormal operating conditions. Neural network 242 may provide values to logic control 244 based on patterns in the data identified by neural network 242.

In an exemplary embodiment each individual vehicle learns from multiple cycles of automated device 210, thereby providing higher accuracy in recognizing abnormal conditions such as obstacle events. The exemplary control system 200 learns the normal operating patterns and recognizes when a deviation from the normal operating pattern is an obstacle event, rather than having the operating parameters determined and programmed in a factory calibration process. The exemplary embodiment may simplify the factory calibration process thereby saving time and costs in product development.

Logic control 244 is any module that implements logic for operating automated device 210. In the exemplary embodiment logic control 244 receives data from neural network 242 related to whether there is an abnormal condition such as an obstacle event, and receives data from conversion module 234. Logic control 244 may be implemented as a logic control configured to determine a result based on imprecise inputs such as a fuzzy logic control module. Logic control 244 may determine whether an obstacle event has occurred based on multiple inputs, with some inputs indicating that an obstacle event has occurred and others indicating that an obstacle event has not occurred. Logic control 244 may also determine whether other operating conditions are present or other changes need to be applied to the operation of automated device 210. Neural network 242 and logic control 244 may work together in artificial intelligence module 240 with neural network 242 providing feedback to modify the logic of logic control 244, and/or logic control 244 providing feedback to modify the pattern recognition of neural network 242. Artificial intelligence module 240 may provide an adaptive decision making process for determining obstacle events as well as other decisions related to operation of automated closure panels. By applying an adaptive decision making process such as the process described below, feedback control module 201 may provide a faster and more accurate determination of an obstacle event.

In one embodiment artificial intelligence module 240 identifies patterns in the frequency components from conversion module 234. Neural network 242 may identify patterns in the data even if the data is not consistent or if there is some unwanted data (e.g. noise) included with the desired data. Neural network 242 may provide multiple inputs to logic control 244 related to whether an obstacle event has occurred. Some of the multiple inputs may by themselves indicate that an obstacle event has occurred, while others may indicate that no obstacle event has occurred. In the exemplary embodiment logic control 244 provides a weighted value to each of the multiple inputs to determine whether an obstacle event has occurred.

Artificial intelligence module 240 may store input values based on normal operating conditions. A position of automated device 210 with respect to time, for example, may be stored as an initial value "$P_{normal}$", based on factory calibrations. Each time automated device 210 operates, the position with respect to time may be measured as "$P_{measured}$" and the stored value may be modified based on the stored value. As a simplified illustrative example, the stored value may be modified by an equation such as $P_{modified}=((T*P_{normal})+P_{measured})/(T+1)$ where "T" is a value to that determines how quickly "$P_{normal}$" is changed by $P_{measured}$. $P_{normal}$ may then be replaced with $P_{modified}$. The measured position with respect to time $P_{measured}$ may also be compared with the store value $P_{normal}$ to produce a position deviation value $P_{dev}$. In a similar manner a load on motor 214 with respect to time may also be stored and updated as $L_{normal}$, with a load deviation $L_{dev}$ determined by artificial intelligence module 240. During operation of the automated device, neural network 242 may continually compare the present conditions to the normal operating conditions and provide $P_{dev}$ and $L_{dev}$ as inputs to logic control 244. In the illustrative example, logic control 244 determines if an obstacle event has occurred by providing each input from neural network 242 with a weight, such as a position weight A, and a load weight B. The weighted values may be added and compared to produce a final value X, for example $X=(P_{dev}*A)+(L_{dev}*B)$. The final value X, may be compared with a threshold value to determine if an obstacle event has occurred. In other embodiments neural network 242 may identify additional patterns, and update a normal set of values in any suitable manner. Logic control 244 may receive additional inputs or different inputs from neural network 242 and/or from other sources, and may determine if an obstacle event occurred using any other suitable form of logic. For example, artificial intelligence module 240 may store the value of measured deviations from normal value to determine when a deviation from normal value is a normal deviation.

After determining whether an obstacle event has occurred, adaptive logic module 230 may communicate with command module 220 to drive motor 214. In the exemplary embodiment command module includes control module 222 and output module 224. Control module 222 may be configured to control the operation of automated device 210 with a control signal 226. If the automated device is liftgate 110 (FIG. 1), for example, control module 222 may be configured to automatically open or close liftgate 110 in response to an input from a user.

In the exemplary embodiment output module 224 provides a control signal 226 to drive motor 214 in response to communication with logic control 244 and control module 222. Output module 224, for example, may use pulse width modulation via pulse width modulation module 225 to drive motor 214. In an exemplary embodiment output module 224 receives data from control module 222, directing output module 224 to drive motor 214 at a certain voltage or current.

Output module 224 may receive communication from logic control 244 to modify the data from control module 222 based on operating conditions, for example, to increase the voltage or current for driving motor 214 by a certain amount. In the exemplary embodiment when an obstacle event is determined, output module 224 receives a signal to reverse motor 214, and output module 224 communicates with control module 222 indicating that the obstacle event was determined.

Figures 6, 7:
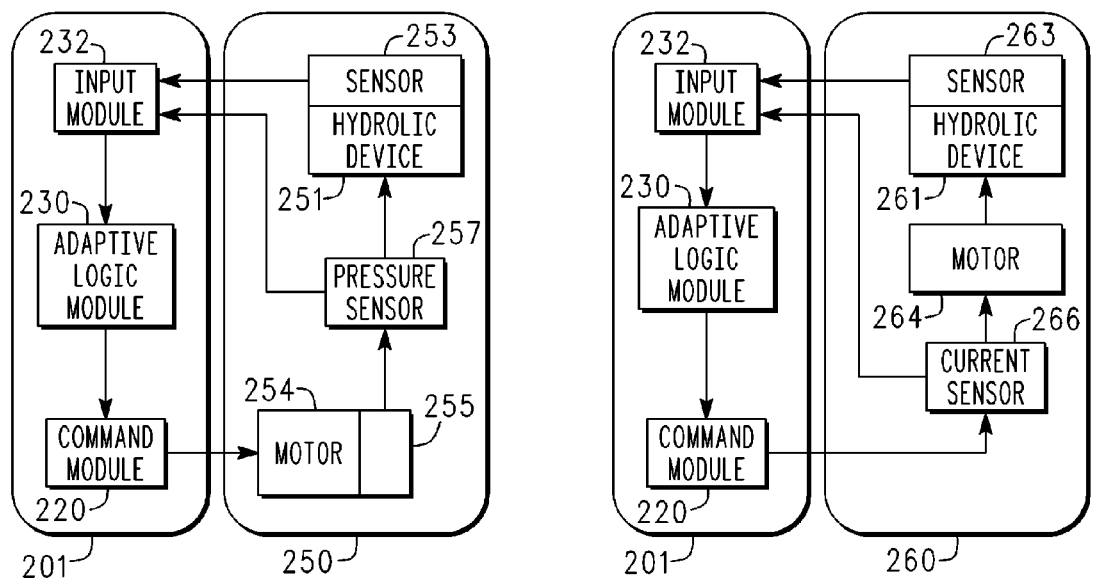
FIG. 6 is a diagram of an exemplary system with a hydraulic automated device.
FIG. 7 is a diagram of an exemplary system with an electromechanical automated device.

A calibration process for configuring control module 222 includes calibrating the motion of the automated device 210, and programming control module 222 with control commands for operating automated device 210. Operating conditions that may affect the operation of automated device 210 may be programmed into neural network 242 and logic control 244 with initial data that may be modified by neural network 242 and logic control 244 based on operating conditions. A kinematic data model with data related to the motion of automated device may be programmed into control module 222 and/or neural network 242 as part of a calibration process. In the exemplary embodiment operating conditions may change such as temperature, altitude, pressure, and/or grade, as well as wear on parts and friction changes or other changes in functioning parts. Neural network 242 and logic control 244 may use pattern recognition to recognize when the current operating conditions are normal conditions and operate the automated device 210 accordingly. In an exemplary embodiment determination of normal operating conditions based on feedback from sensors 212 and 216 allows obstacle events and other abnormal operating conditions to be determined with greater accuracy. Extensive testing to determine operating conditions and operating parameters may not be needed as neural network 242 may learn the operating parameters based on measured operating conditions. Neural network may also adapt to changes in the operating conditions. The calibration process in the exemplary embodiment is performed for a specific type of mechanism module 202, and for a specific automated device 210. Various embodiments of mechanism module 202 may be used. FIGS. 6 and 7, for example, show alternative embodiments with configurations of mechanism module 202.

In the embodiment shown in FIG. 6, the mechanism module is a hydraulic mechanism module 250. Feedback control module 201 may be communicatively coupled to the hydraulic mechanism module 250. Hydraulic mechanism module 250 may include a hydraulic pump motor 254 mechanically coupled to a hydraulic pump 255. In the exemplary embodiment a motor sensor 216 (FIG. 5) is a pressure sensor 257 that measures a characteristic of the output from hydraulic pump motor 254 and hydraulic pump 255 by measuring the pressure of hydraulic fluid at the output of hydraulic pump 255. Pressure sensor 257, for example, may be mounted at an outlet of hydraulic pump 255. Pressure measured by pressure sensor 257 may be related to the load on pump motor 254, and may also be related to the force exerted by pump motor 254 on hydraulic automated device 251. A signal from pressure sensor 257 may be received by input module 232 and may be used for feedback control, and/or obstacle detection. Hydraulic pump 255 may be used to actuate hydraulic automated device 251, such as a liftgate operated by hydraulic actuators. Position sensor 212 (FIG. 5) in the exemplary embodiment is an accelerometer sensor 253 that measures the acceleration of hydraulic device in an x-plane and in a y-plane. Information from accelerometer sensor 253 may be used to determine the position of hydraulic automated device 251. Feedback control module 201 may receive signals from accelerometer sensor 253 and from pressure sensor 257 for feedback control and for determining if an obstacle event has occurred.

In another embodiment shown in FIG. 7, feedback control module 201 is communicatively coupled to an electromechanical mechanism module 260. Electromechanical mechanism module 260 may include an electric motor 264 and a current sensor 266 for motor sensor 216 (FIG. 5) that measures the current supplied to electric motor 264. A Hall effect sensor 263 may be used as a position sensor 212 (FIG. 5) to determine the position of a spindle of electric motor 264. Signals from current sensor 266 and Hall effect sensor 263 may be received by feedback control module 201. In the exemplary embodiment the current supplied to electric motor 264 is related to a force exerted by electric motor 264 on automated device 261. In the exemplary embodiment electric motor 264 affects movement of automated device 261 using mechanical actuators such as gears and levers. Feedback control module 201 may be configured and calibrated with data related to the relationship between the position of the spindle of electric motor 264, and the position of automated device 261. By using stored calibration data, feedback control module 201 may determine the position of automated device 261 based on information received from Hall effect sensor 263.

In other embodiments mechanism module 202 (FIG. 5) may have other configurations than those discussed in FIGS. 6 and 7. The load on hydraulic pump motor 254 (FIG. 6), for example, may be measured using a current sensor instead of, or in addition to, pressure sensor 257. Motor sensor 216 (FIG. 5) may be a part of command module 220, such as a software module that calculates the current delivered to motor 214 based on control signal 226. Other methods of measuring the load on motor 214 and the position of automated device 210 may be used in other embodiments.

Figure 8:
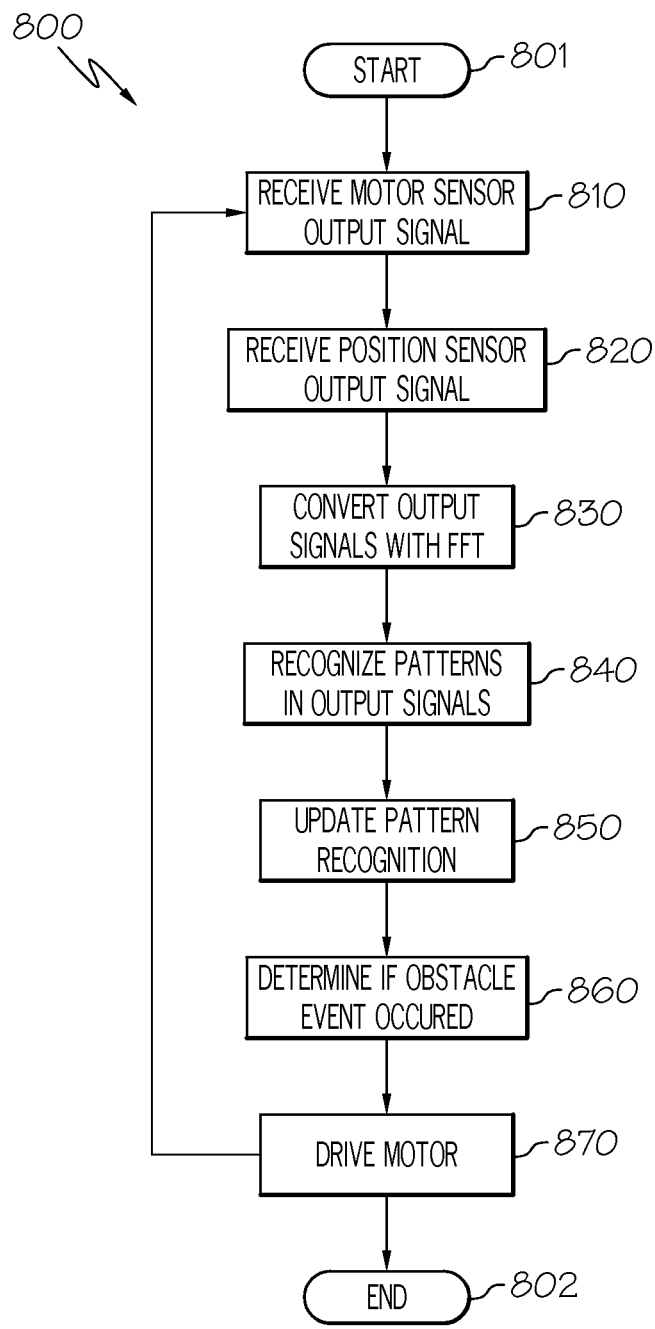
FIG. 8 is a flow chart of an exemplary method of controlling an automated device.

Turning now to FIG. 8, an exemplary method 800 for determining obstacle events suitably includes the broad functions of receiving input data including motor sensor output signal (function 810) and position sensor output signal (function 820), processing the input signals using pattern recognition (function 840), and determining if an obstacle event has occurred (function 860). Other embodiments may additionally convert the output signals using a fast Fourier transform algorithm (function 830) and/or may update the pattern recognition (function 850) using input data and/or other information as appropriate. Various other functions and other features may also be provided, as described in increasing detail below.

Generally speaking, the various functions and features of method 800 may be carried out with any sort of hardware, software and/or firmware logic that is stored and/or executed on any platform. Some or all of method 800 may be carried out, for example, by logic executing within feedback control module 201 in FIG. 5. In one embodiment, feedback control module 201 executes software logic that performs each of the various functions shown in FIG. 8. Such logic may be stored in a memory or in any other storage available to a processor as desired. Hence, the particular logic and hardware that implements any of the various functions shown in FIG. 8 may vary from context to context, implementation to implementation, and embodiment to embodiment in accordance with the various features, scenarios and structures set forth herein. The particular means used to implement each of the various functions shown in FIG. 8, then, could be any sort of processing structures that are capable of executing conventional software logic in any format. Such processing hardware may include a processor that is a component of feedback control module 201, or other components of control system 200 in FIG. 5, as well as any other processors or other components associated with any conventional control systems.

FIG. 8 shows a flow chart of an exemplary method 800 of controlling an automated device in a vehicle. In an exemplary vehicle an automated device is actuated by a motor with a motor sensor, and a position sensor is used to determine the position of the automated device. Exemplary method 800 starts at function 801. A feedback control module may receive input data from the motor sensor (function 810) related to the present load on the motor, and input data from the position sensor (function 820) related to the present position of the automated device. The feedback control module may have a data acquisition unit that receives the input data, as well as other information. The input data may be a digital signal or an analog signal. In one embodiment of exemplary method 800, input data is converted to a digital format by an analog to digital converter that is part of a digital signal processor. Other signals may be received, and other method of receiving input data may be performed in embodiments of method 800.

In exemplary method 800 the input data from the motor sensor and the position sensor are converted to a format with frequency components using a fast Fourier transform (FFT) conversion (function 830). A pattern recognition process may be used to process input data and perform pattern recognition (function 840) based on the converted signals and other input information, such as position of the automated device and/or load on the motor with respect to time. In exemplary method 800, the FFT conversion may allow the feedback control module to quickly identify changing conditions, or changes that occur in the input data during an obstacle event. Multiple frequency components of a position sensor output signal, for example, may be produced by conversion module 234 (FIG. 5) and sent to neural network 242 and/or logic control 244.

The pattern recognition process may be adaptive such as a neural network, and may be updated with information from the input data (function 850). With an adaptive pattern recognition process, the feedback control module can learn the characteristics of normal operation, such as when a liftgate opens or closes without encountering obstacles. The normal operating conditions may change based on measurable changes such as temperature, pressure, and/or grade (angle of the vehicle). In one embodiment of method 800, sensors on the vehicle measure temperature, pressure, and grade and communicate the present conditions to the feedback control module. The adaptive pattern recognition process may then be updated with normal operating data, or normal feedback from motor sensor and position sensor under the present operating conditions. Based on the measured input data, parameters may be developed by the adaptive pattern recognition process to determine if the operation of the automated device is normal. The pattern recognition process may also be updated when a specific abnormal event occurs, such as an obstacle event. In an embodiment of method 800 the pattern recognition process develops parameters for determining when an obstacle event occurs. For example, the pattern recognition process may store the value of measured deviations from normal value to determine when a deviation from normal value is a normal deviation, or an abnormal deviation. The operating conditions of the automated device may also change because of changing conditions that are not measured, such as changes in friction, wear of parts, minor damage to parts, as well as other changes. The pattern recognition process may also be configured to adapt to the changes caused by unmeasured changes in the operating environment.

In exemplary method 800 the output from the pattern recognition process, such as deviation values, is used by a logic control module to determine if an obstacle event has occurred (function 860). The logic control module, for example, may used weighted values providing different weight to different deviation values to produce a final value that is compared with a threshold value for an obstacle event. If an obstacle event is determined to exist, for example, the command module may send control signals to reverse the motor operation, causing the automated device to move in an opposite direction. Other conditions such as extreme heat or extreme cold may also be determined by the logic control module. The determination of conditions may be used by a command module to drive the motor (function 870). If extreme heat or extreme cold are determined to exist, for example, then the command module may increase or decrease voltage to motor in a suitable manner. In this manner the pattern recognition process and the logic control module may determine suitable changes for operating the automated device based on the input signals.

The feedback control module may continue to receive the input data as the motor drives, and may continue to determine if an obstacle event or other condition has occurred. Exemplary method 800 may allow a control system with an automated device to quickly and accurately determine when abnormal events occur such as an obstacle event, and to direct changes in response to the abnormal events. Exemplary method 800 ends at function 802.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control system for an automated closure panel in a vehicle comprising:
   a command module comprising a control module and an output module,
      wherein the control module is configured to generate a control signal based on a calibrated kinematic data model of an operating behavior pattern of the automated closure device,
      wherein the output module is configured to modify the control signal based on sensed operating conditions;
   a motor configured to actuate the automated closure panel based upon the control signal;
   a position sensor configured to provide a position sensor output signal indicating a position of the automated closure panel;
   a motor sensor configured to measure an output characteristic of the motor, the motor sensor having a motor sensor output signal; and
   an adaptive logic module coupled to the command module, to the position sensor, and to the motor sensor, wherein the adaptive logic module comprises a neural network configured to recognize deviations from the calibrated kinematic data model of the operating behavior pattern of the automated closure device based on changes in the motor sensor output signal and changes in the position sensor output signal, the neural network is configured to provide an output signal to the output module, which modifies the control signal based on the deviations that determines when the automated closure panel is obstructed by an obstacle based upon the motor sensor output signal.

2. The control system of claim 1 wherein the command module comprises a pulse width modulation module configured to drive the motor using a pulse width modulation technique.

3. The control system of claim 1 wherein the automated closure panel is an automated liftgate.

4. The control system of claim 1 wherein the motor is a hydraulic pump motor for a hydraulic pump, and the automated closure panel is a hydraulic powered device.

5. The control system of claim 4 wherein the motor sensor is a pressure sensor configured to measure an output hydraulic pressure of the hydraulic pump.

6. The control system of claim 1 wherein the motor is an electric motor and the automated closure panel is mechanically actuated by an actuator coupled to the electric motor.

7. The control system of claim 6 wherein the motor sensor is a current sensor configured to measure an electrical current supplied to the electric motor and wherein the electrical current is proportional to a force exerted by the electric motor.

8. The control system of claim 1, wherein the position sensor is communicatively coupled to the adaptive logic module and sends the position sensor output signal to the adaptive logic module.

9. The control system of claim 8 wherein the adaptive logic module further comprises a fuzzy logic module configured to receive an output from the neural network.

10. The control system of claim 8 wherein the position sensor is an accelerometer connected to the automated closure panel and is configured to measure relative movement of the automated closure panel.

11. The control system of claim 8 further comprising a conversion module communicatively coupled to the adaptive logic module and configured to convert the motor sensor output signal and the position sensor output signal to a frequency spectrum signal, wherein the adaptive logic module is configured to receive a digital format signal.

12. The control system of claim 11 wherein the conversion module is a fast Fourier transform module configured to perform a fast Fourier transform of the motor sensor output signal and the position sensor output signal.

13. A vehicle comprising:
an automated device that is actuated by a motor;
a motor sensor having a motor sensor output signal that is related to an output characteristic of the motor;
a position sensor having a position sensor output signal that is related to a position of the automated device; and
a feedback control module comprising:
an adaptive logic module comprising a neural network configured with a calibrated kinematic model of an operating behavior of the automated device and further configured to recognize deviations in the calibrated operating behavior pattern of the automated closure device based on the motor sensor output signal and the position sensor output signal and configured to determine when the automated device is obstructed by an obstacle based on the deviations; and
a command module communicatively coupled to the adaptive logic module and configured to generate a control signal to drive the motor based on a comparison of the motor sensor output signal and the position sensor signal to a stored operating behavior pattern from the kinematic model of the automated device.

14. The vehicle of claim 13 wherein the automated device is selected from a group consisting of: an automated liftgate, an automated sliding door, an automated hinged door, an automated trunk lid, and an automated folding seat.

15. A method of controlling an automated device in a vehicle via neural network, wherein the automated device is actuated by a motor, the method comprising:
receiving input data by the neural network related to a load on the motor and to a position of the automated device;
processing the input data by identifying frequency patterns in the input data;
comparing the input data patterns to a kinematic data model of an operating behavior of the automated device;
determining if the automated device is obstructed by an obstacle based on identifying deviations from the kinematic data model of the operating behavior by the patterns in the input data; and
driving the motor based upon the determination of whether the automated device is obstructed.

16. The method of claim 15 wherein the processing includes converting the input data into frequency components prior to the pattern recognition module identifying patterns.

17. The method of claim 15, wherein the pattern recognition module includes the neural network.

* * * * *